March 22, 1966 H. E. LLOYD 3,241,519

TENSIONED AND COOLED MASK

Filed April 5, 1962 2 Sheets-Sheet 1

INVENTOR

Harold E. Lloyd,

BY R. P. Miller

ATTORNEY

March 22, 1966 H. E. LLOYD 3,241,519
TENSIONED AND COOLED MASK
Filed April 5, 1962 2 Sheets-Sheet 2
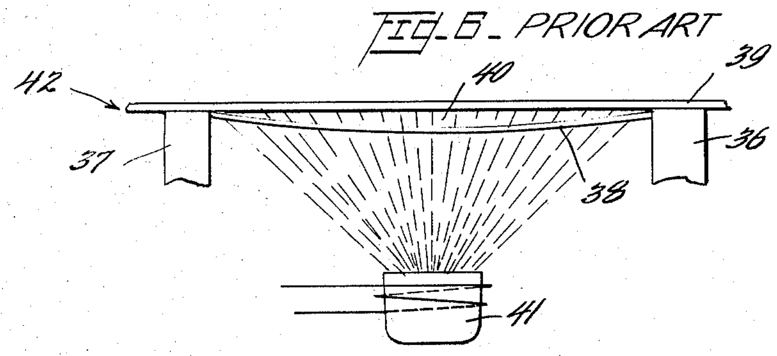
FIG. 6 - PRIOR ART
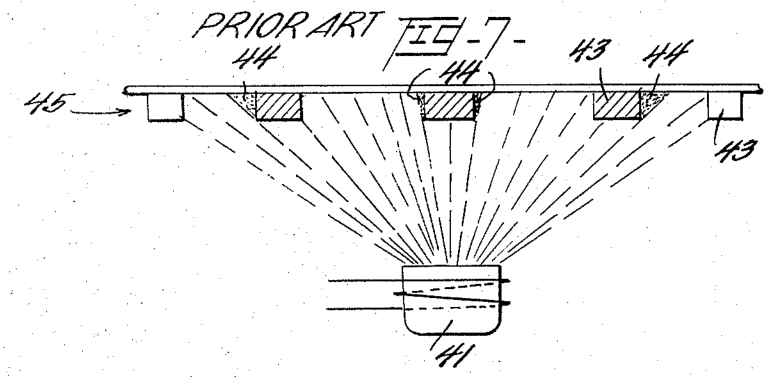
PRIOR ART FIG. 7
INVENTOR
Harold E. Lloyd,
BY R. P. Miller
ATTORNEY United States Patent Office 3,241,519
Patented Mar. 22, 1966

3,241,519

TENSIONED AND COOLED MASK

Harold E. Lloyd, Winston-Salem, N.C., assignor to Western Electric Company, Incorporated, New York, N.Y., a corporation of New York Filed Apr. 5, 1962, Ser. No. 185,258
2 Claims. (Cl. 118—49)

The present invention relates to a tensioned and cooled mask and more particularly to a pretensioned and cooled mask for use in coating operations.

In the manufacture of thin film capacitors it is necessary to accurately coat a surface with a thin metallic film of definite dimensions. In the past, masks of various types have been employed, however, none of these masks have satisfactorily performed. The coating is performed by vaporizing a metal in a vacuum and projecting it through the mask onto the surface. The metal vapors cause the area adjacent the mask to attain high temperatures. When thin masks were used to provide fine borders along the deposited film, it was found that the high temperatures caused the thing masks to expand and sag thereby allowing the vapors to get under the masks. When heavier masks were used to prevent sagging, it was found that the thickness of the masks caused fuzzy edges and definite side dimensions could no longer be obtained. In order to alleviate these problems, it is necessary that a mask be provided that is thin and will not sag under elevated temperature conditions.

It is an object of the present invention to provide a new and improved mask for use in coating operations.

It is another object of the present invention to provide a mask for use in coating operations, having facilities for tensioning the masking elements.

It is still another object of the present invention to provide a mask for use in coating operations having instruand improved mask for use in coating operations.

It is another object of the present invention to provide a mask for use in coating operations, having facilities for mentalities for pretensioning and cooling the masking elements.

With these and other objects in view, the present invention contemplates a frame member having masking strips extending from one side of the frame to the other. The frame member supports the strips and is provided with gripping elements that engage the ends of the masking strips for tensioning the strips. Additionally, the supporting frame is provided with conduits for receiving a coolant for conducting heat away from the masking strips.

Other objects and advantages of the present invention will become apparent from the following detailed description when considered in conjunction with the accompanying drawings, wherein:

FIG. 6 is a fragmentary sectional view illustrating the deficiencies of a mask employing thin bars; and FIG. 7 is a fragmentary sectional view of a mask employing thick bars particularly showing the uneven coating attained.

Figures 1, 2, 3, 4:
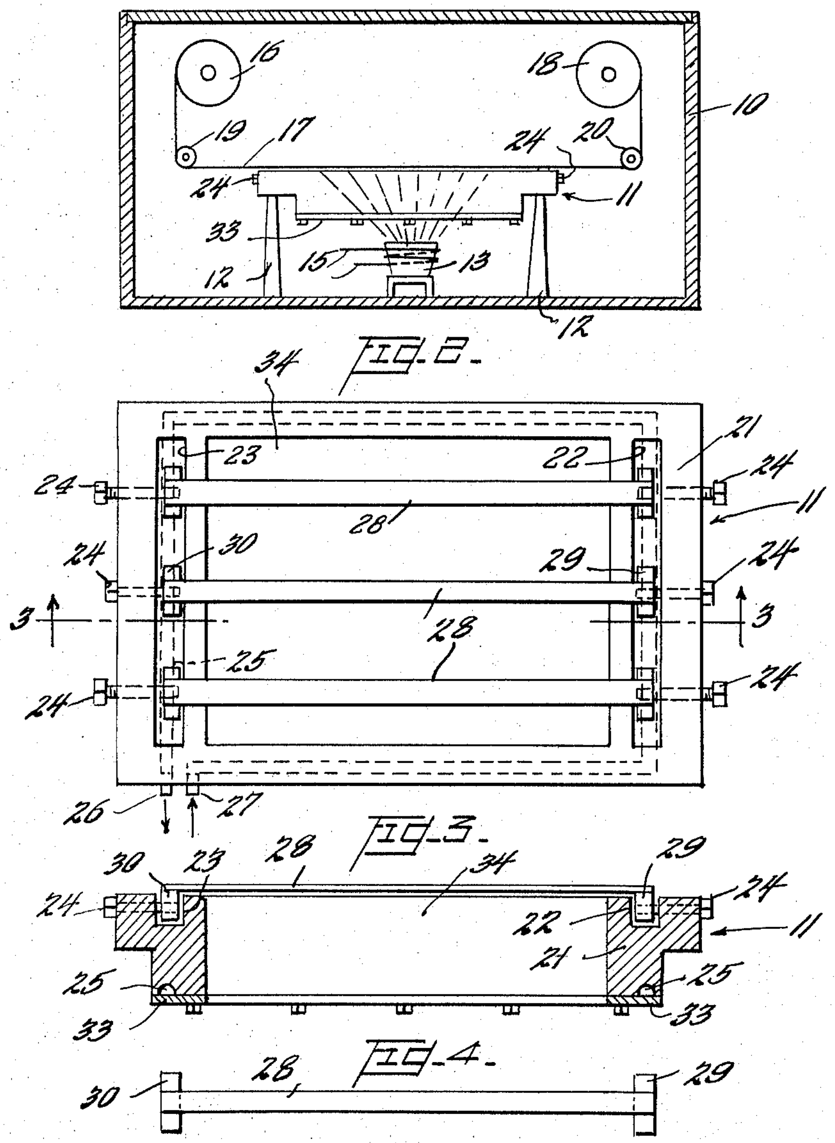
FIG. 1 shows a vacuum metalizing chamber employing a mask embodying the principles of the invention.
FIG. 2 is a top view of the mask illustrating a frame, a tensioning element, and masking strips.
FIG. 3 is a sectional view of the masking device taken along line 3—3 of FIG. 2 showing cooling conduits in the supporting frame.
FIG. 4 is a top view of a masking strip.

Referring to FIG. 1, there is shown a vacuum metalizing chamber 10. A mask generally designated as 11 is positioned within the chamber 10 and supported on legs 12. A crucible 13 is beneath the mask 11 and is surrounded by a heating element 15. A moving substrate 17 such as paper, plastic, or other sheet material, is taken off a roll 16 and passes around an idler 19 across the mask 11 and around idler 20 onto a take-up roll 18. Metal in the crucible 13 is vaporized by the heating element 15 and is drawn upward and passes through the masking device and impinges upon the substrate 17 due to the vacuum.

Referring to FIGS. 2 and 3, there is shown the mask 11 comprising a rectangular supporting frame 21 constructed of copper or some other heat conducting material. The supporting frame 21 has an opening 34 and a pair of elongated slots 22 and 23 formed in opposite sides of the frame. Gripping elements, such as screws 24, extend through the sides of the frame 21 and terminate in the slots 22 and 23. Conduits 25 are formed or bored into the frame 21 and a plate 33 is secured to the frame to enclose the conduits.

Figure 5:
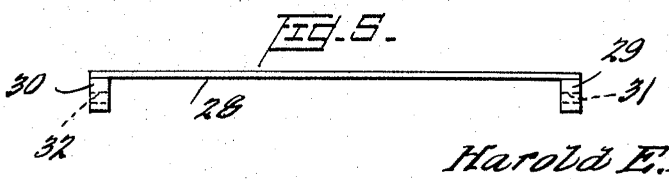
FIG. 5 is a side view of the masking strip shown in FIG. 4.

Referring now to FIGS. 4 and 5, there is shown one of a plurality of thin masking strips or bars 28 (FIG. 2) having depending end portions 29 and 30. The masking strip may be .093 inch wide and .031 inch thick and is constructed of heat conducting material. The end portions 29 and 30 have threaded apertures 31 and 32. In FIG. 2, the masking strips 28 are placed on the frame 21 and supported thereby. The end portions 29 and 30 of the masking strips 28 depend into the slots 22 and 23. The screws 24 are engaged in the apertures 31 and 32 for securing the strips 28 in position.

Referring to FIG. 6 there is shown a mask 42 comprising a pair of supporting members 36 and 37 with a thin bar 38 extending between the supports. The mask 42 is interposed between a source of metal vapor 41 and a moving substrate 39. The vapors emanating from the source 41 pass through the mask 42 and impinge upon the substrate 39 creating a high temperature in the vicinity of the mask. The bar 38 is shown sagging due to expansion caused by the high temperature. The sagging of the bar 38 permits the metal vapors to impinge under the bar as indicated at 40.

In order to alleviate the sagging, heavier and thicker bars were employed as shown in FIG. 7. The mask 45 which utilized heavier and thicker bars 43 is interposed between a source of vapor 41 and a moving substrate 39. The vapors emanating from the source 41 and passing through the mask 45 onto the substrate 39 cause elevated temperatures in the vicinity of the mask, however, the bars 43 being of a heavier construction do not sag. It was found that the thicker bars 43 created a new problem; namely, the vapors were unable to reach the substrate at points 44 because of the thickness of the bars and as a result, fuzzy edges occurred adjacent the bars. The use of the mask 11 which is the subject of the present invention eliminates these difficulties as will now be described.

The mask 11 as shown in FIGS. 1 and 2 is interposed between the crucible 13 and the moving substrate 17. The thin bars 28 subtend the opening 34 in the frame 21 in the direction of travel of the substrate 17. Vapors emanating from the crucible 13 pass through the mask 11 and impinge upon the substrate 17.

Prior to coating, the screws 24 are engaged in the threaded apertures 31 and 32 in the depending ends 29 and 30 of the thin bars 28. The screws 24 are then tightened to pretension the bars 28. The conduit 25 in the frame 21 is connected to a source of coolant (not shown) through tube 26 and 27 is attached to a drain (not shown).

In operation the heat produced by the vapors in the vicinity of the mask 11 will cause the strips 28 to expand and relieve the pretension. The coolant flowing through the conduit 25 will continually remove the heat from the heat conducting bars 28 through the heat conducting support 21. These innovations in masks prevent thin masks from sagging and permit accurate coating of a moving substrate.

It is to be understood that the above-described arrangement of apparatus is simply illustrative of the application and principles of the invention and many other modifications may be made without departing from the spirit and scope of the invention.

What is claimed is:

1. In an apparatus for depositing metal vapor from a source onto a moving substrate, a mask interposed between said source and said substrate comprising a heat conductive frame having an opening through which the metal vapor passes, said frame having a pair of slots running along opposite sides of said frame in directions transverse to the direction of movement of the substrate, a plurality of bars subtending said opening in the direction of travel of said substrate, each of said bars having opposite end portions separately depending into said slots, each of said slots having a width which is greater than the thickness of said depending ends of said bars, means mounted on said frame and engaging the depending end portions of said bars in said slots for applying a tension force to said bars, and said frame having means positioned beneath said slots for receiving a coolant to conduct heat away from said bars through said frame to said coolant.

2. In an apparatus for depositing metal vapor from a source onto a moving substrate, a mask interposed between said source and said substrate comprising a rectangular heat-conducting frame having an opening through which the metal vapor passes, said frame having a pair of elongated slots running along opposite sides thereof in directions transverse to the direction of movement of the substrate, a plurality of bars subtending said opening in the direction of travel of said substrate, each of said bars having opposite end sections separately depending into said slots, each of said slots having a width which is greater than the thickness of said depending sections of said bars, each depending section having a threaded aperture, and screws extending through said frame to respectively enter into said threaded apertures for applying a tension force to each of the bars, said frame having a substantially rectangular conduit positioned beneath said slots for receiving a coolant to conduct heat from said bars through said frame to said coolant to maintain said bars under tension.

References Cited by the Examiner

UNITED STATES PATENTS

| | | | |
|---|---|---|---|
| 2,702,760 | 2/1955 | Barth | 118—49 |
| 2,745,773 | 5/1956 | Weimer | 118—49 X |
| 3,044,438 | 7/1962 | Osswald et al. | 118—504 X |

MORRIS KAPLAN, *Primary Examiner.*

RICHARD D. NEVIUS, WILLIAM D. MARTIN, CHARLES A. WILLMUTH, *Examiners.*